July 21, 1959
D. F. HORNIG ET AL
2,896,165
RATIO MEASUREMENT APPARATUS
Filed July 26, 1951
3 Sheets-Sheet 1
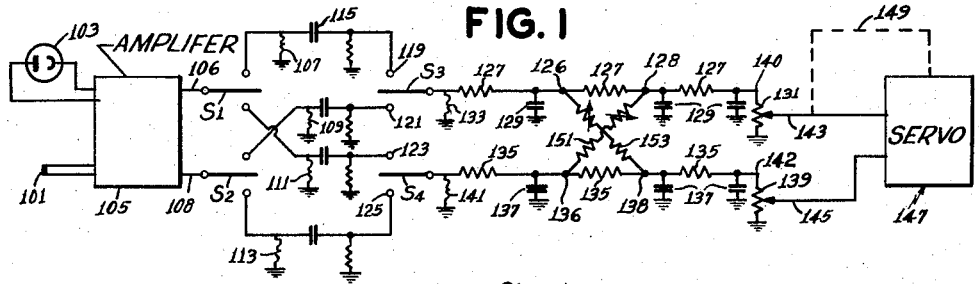
FIG. 1
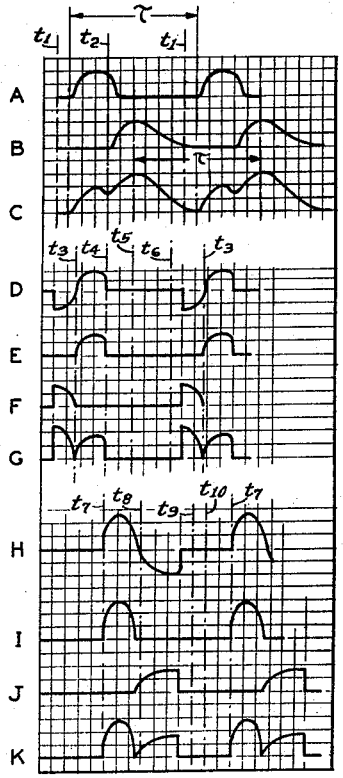
FIG. 2
FIG. 3
INVENTORS
Donald F. Hornig
George E. Hyde
BY Pennie, Edmonds,
Morton, Barrows and Taylor
ATTORNEYS July 21, 1959
D. F. HORNIG ET AL
2,896,165
RATIO MEASUREMENT APPARATUS
Filed July 26, 1951
3 Sheets-Sheet 3
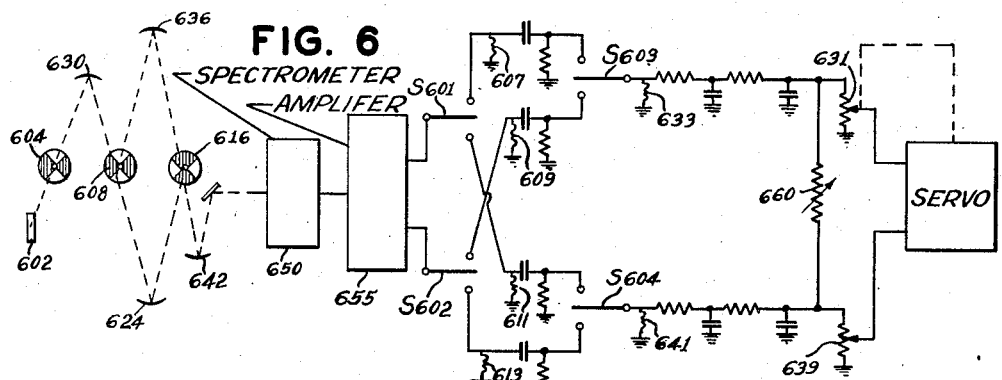
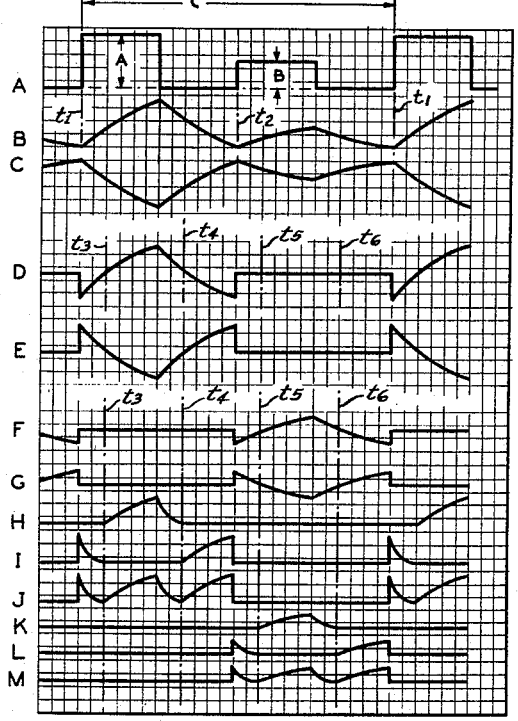
FIG. 7
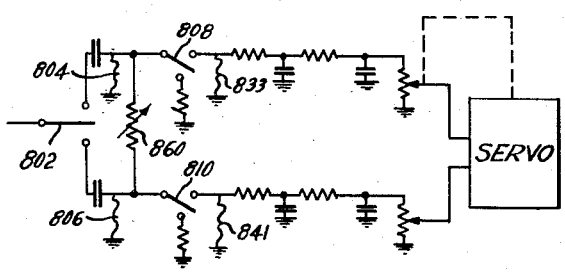
INVENTORS
Donald F. Hornig
George E. Hyde
BY Pennie, Edmonds,
Morton, Barrows and Taylor
ATTORNEYS

United States Patent Office 2,896,165
Patented July 21, 1959

2,896,165

RATIO MEASUREMENT APPARATUS

Donald F. Hornig, Providence, R.I., and George E. Hyde, Metuchen, N.J.

Application July 26, 1951, Serial No. 238,745

12 Claims. (Cl. 324—140)

This invention relates to apparatus for measurement of the ratio of two quantities and more particularly to a method and means for measurement of the true ratio of such quantities despite imperfect separation thereof in the two channels from which they are taken for comparison. The invention has especial application to measurement of the ratio of two D.C. voltages or currents as a means of comparing the amplitudes of two periodic signals of the same period, which may be electrical, optical, thermal or even mechanical.

In various known forms of apparatus, such as photometers, the periodic signals to be compared generate voltage or current pulses in some form of transducer or in separate transducers. The voltages so generated are then typically amplified in A.C. amplifiers, rectified and filtered, although D.C. amplifiers may also be employed. Upon filtering of the D.C. voltages so obtained a potentiometer circuit may be employed to compare them. Thus for example one voltage is made available in one channel and the other in a parallel channel. The channels are terminated by resistances of which one is a potentiometer. The voltages across one terminating resistance and across the tapped portion of the potentiometer which terminates the other channel are then compared in some form of circuit, and the potentiometer tap is adjusted until the comparison circuit sees two equal voltages. The position of the tap is then a measure of the ratio of the two D.C. voltages in the two channels.

The voltage pulses which can be obtained from the original (e.g. optical) periodic signals to be compared will typically be of low level and must be amplified to a much higher level for actuation of the potentiometric comparison circuit. In order to insure equal treatment of the two sets of voltage pulses it is usually desirable to pass both sets through as many common elements as possible in the generation of the D.C. voltages which are ultimately to be compared. Usually therefore a single transducer will be employed, excited by both sets of signals. Further the output of the transducer or even of separate transducers if such are used will usually be passed through a common amplifying circuit. If there is employed any element common to the paths of the two signals in their transformation from their original form to the D.C. voltages by which the ratio of the amplitudes of the original signals is to be measured, it will be necessary to sort the output of such a common element into separate portions, each proper to one of the two periodic signals.

If the periodic signals of interest succeed each other in time at adequate intervals so that, having regard to the time constant of the transducer and phase shift characteristics of the amplifier (if such are the common elements), there appear time intervals between the voltage pulses proper to one of the periodic signals and those proper to the other, the sorting may be achieved in time by switching the output of the common element first to one channel and then to the other. Or the sorting may be accomplished by phase discrimination, having due regard to the phase relationship of the initial signals. In practice however neither sorting by time separation nor phase discrimination can be complete, at least unless a large part of the energy content of the voltage pulses at the output of the common element is to be sacrificed. Unequal phase shift for different frequencies in a common amplifier is a typical example of a form of mixing of the two sets of voltage pulses into a mixture which cannot be corrected by any form of sorting.

If however the original signals being compared are of the same period and are of pulse shape, and if the response function of the common elements is such that their response to a pulse-shaped input is pulse-shaped also, i.e. subject to the requirement only that at some time after the beginning of each input pulse the response to that pulse shall become negligibly small, and if further the common elements of the system are linear, then the value of the D.C. component of voltage in the two channels which follows the sorting to the separate channels will be of the form:

$$S_G = Ar + Bs \qquad (1)$$
$$S_H = Au + Bv \qquad (2)$$

If instead the A.C. component present in the two channels after sorting is subsequently separated from the D.C. and rectified, it will also be of this same form, with however different constants $r$, $s$, $u$ and $v$, and the invention is applicable whichever component is selected. It can in fact be shown generally that if pairs of pulses of amplitudes A and B are repeated periodically, passed through a linear system, subjected to any switching operations and averaged, the result is always of the form $$S = aA + bB$$

In Equations 1 and 2 $S_G$ and $S_H$ are the D.C. voltage amplitudes in the channels, after sorting, or after sorting and rectification as the case may be. A and B are the amplitudes of the periodic signals (electrical, optical or whatever) to be compared, and $r$, $s$, $u$ and $v$ are constants. Equations 1 and 2 hold whether the D.C. component of the transducer response is retained or not. The constants $r$ and $s$ depend only on the amplitudes of A and B, on the form of the time function which defines one of the periodic signals being compared, on the sorting times or phases (referred to the cycle of the two signals) and on the phasing of the rectifying operation in the channel where $S_G$ is derived, if rectification is employed. Similarly $u$ and $v$ are constants dependent only on the amplitudes, on the form of the time function defining the second of the two periodic signals and on the sorting times and phasing of the rectifying operation as applied to the second channel.

Typically, with properly chosen sorting and rectifying intervals, $r$ and $v$ will be positive, and $s$ and $u$ will be small compared to $r$ and $v$, and of negative sign. In general however $s$ and $u$ will not be zero, and the resulting presence of B and $S_G$ and of A in $S_H$ constitutes mixing, which prevents $S_G$ and $S_H$ from measuring the true ratio of A and B. In principle indeed $r$, $s$, $u$ and $v$ can be either positive or negative and of any magnitude. The ratios $$\frac{s}{r} \text{ and } \frac{u}{v}$$

can be referred to as the mixing constants, specifying the degree of mixing in the two channels.

According to the invention there is fed from each channel to the other a fraction (positive or negative and greater or less than unity) of the voltage in the first, or a fraction of the difference in voltage between the two, so proportioned that although the values of $S_G$ and $S_H$ are changed in the process, the resulting changed $S_G$ is proportional to A, and the resulting changed $S_H$ is proportional to B.

Fractions of the voltages present in the channels are fed to the other channels by means of vacuum tube amplifiers, and fractions of the voltage difference are fed across with resistors. The amplifications of the amplifiers or the values of the resistors are adjusted so that upon suppressing first one and then the other of the initial periodic signals to be compared, the voltages in each channel are made zero, one by one. It may be necessary to repeat the adjustment a number of times to effect complete compensation.

The signal mixing to which the invention relates is in general the result of two effects (which can arise from many causes) which tend to compensate each other but of which the negative effect usually preponderates, giving to $s$ and $u$ negative values.

When a pulse-shaped signal is passed through an amplifier of limited low frequency pass band, the resulting phase distortion produces a negative undershoot at the trailing edge of the pulse. When pulses of the two series succeed each other in rapid succession, there results a subtraction from each pulse of a voltage-time increment due to the undershoot from the preceding pulse. On the other hand if the two sets of pulses are generated in a single transducer such as a thermocouple or bolometer, the response of the transducer due to any one pulse will not in general decline to zero at the end of the exciting pulse, e.g., of light applied to the transducer, and may not decline to zero before the arrival of the next pulse, which represents the other of the two signals being compared. The effect of such transducer time constants when comparable to or greater than the interval between successive pulses is to increase the amplitude of each voltage pulse by an increment from the preceding pulse. Usually however the negative or subtractive effect due to amplifier distortion preponderates and, in general, it can be made to do so by further restriction of the amplifier pass band.

When the negative effect does preponderate, so that $s$ and $u$ are negative, compensation is effected by passing from each channel a positive fraction of the voltage therein to the other channel, to make up for the deficiency in the other channel produced by the negative value of the applicable constant $s$ or $u$. In the usual cases where $s$ or $u$ is positive, it is necessary to make available the negative of $S_G$ or $S_H$, either by a supplementary switching operation or by phase inversion means of some sort such as the use of a vacuum tube or transformer.

In the following detailed description, a number of embodiments of the invention will be described which will feed across fractions of the voltages present in the two channels, or of their differences, to effect compensation. In an important case with which the invention deals however, the mixing will be "symmetric" so that the proportion $u$ of the first signal present in the output channel proper to the second is equal to the proportion $s$ of the second signal present in the output channel proper to the first. (See Equations 1 and 2.) Under such conditions the two mixed D.C. voltages to be corrected according to the invention will be of the form:

$$S_G = aA + bB \quad (3)$$

$$S_H = bA + aB \quad (4)$$

The mixing will be symmetric in the sense required by Equations 3 and 4 whenever (assuming of course linear common elements for the system):

(a) The pulses of the two signals being compared have the same shape;

(b) The pulses of the two signals are equidistant, those of one set being separated from those of the other by half the pulse period;

(c) Sorting is effected at intervals of half the pulse period;

(d) The rectifying points in one channel consist of two arbitrarily chosen points and of two others respectively separated from the first by half of the pulse period; and (e) The rectifying points in the second channel are separated from those of the first by half of the pulse period.

Conditions (a)—(e) above may be summarized in the requirement that all events in one channel must be separated from those in the other by one half of the pulse period or by the requirement that any part of the entire system which handles one signal must have an identical counterpart handling the other signal.

When the mixing is symmetric, compensation may be effected by feeding from each channel the same fraction (positive or negative) of the voltage present therein to the other channel, or the same fraction (positive or negative) of the voltage difference between the two channels. In the vast majority of cases the fraction required is less than unity and positive in value.

The invention will now be described in terms of a number of embodiments shown in conjunction with typical apparatus giving rise to form of mixed signals with which the invention deals. In the accompanying drawings Fig. 1 is a schematic diagram of an embodiment of the invention employing resistors cross connected between two signal channels to derive from signals of the form $$S_G = Ar + Bs = r\left(A + \frac{s}{rB}\right)$$

$$S_H = Au + Bv = v\left(\frac{u}{vA} + B\right)$$

modified signals $S_{G''}$ and $S_{H''}$ such that the ratio of $S_{G''}$ to $S_{H''}$ is equal to the ratio of A to B multiplied by a constant factor, where A and B are the amplitudes of the two periodic signals to be compared. In the embodiment of Fig. 1 the transformation of $S_G$ and $S_H$ into $S_{G''}$ and $S_{H''}$ is performed by transferring from each of two output signal channels to the other a fraction of the voltage difference between the two.

Fig. 2 is a series of waveforms illustrating the derivation of the signals $S_G$ and $S_H$ for whose mixing compensation is achieved in the circuit of Fig. 1.

Fig. 3 is a schematic diagram of an embodiment of the invention employing vacuum tube circuits to feed from each channel a fraction of the voltage therein to the other channel. Unlike the embodiment of Fig. 1 it is capable of effecting compensation for all types of mixing, regardless of the sign and magnitude of the constants $r$, $s$, $u$ and $v$. The embodiment of Fig. 3 further illustrates that the invention is applicable whether half or full wave rectification is employed in the derivation of signals $S_G$ and $S_H$ when the A.C. component of the sorted signal is used.

Figure 4:
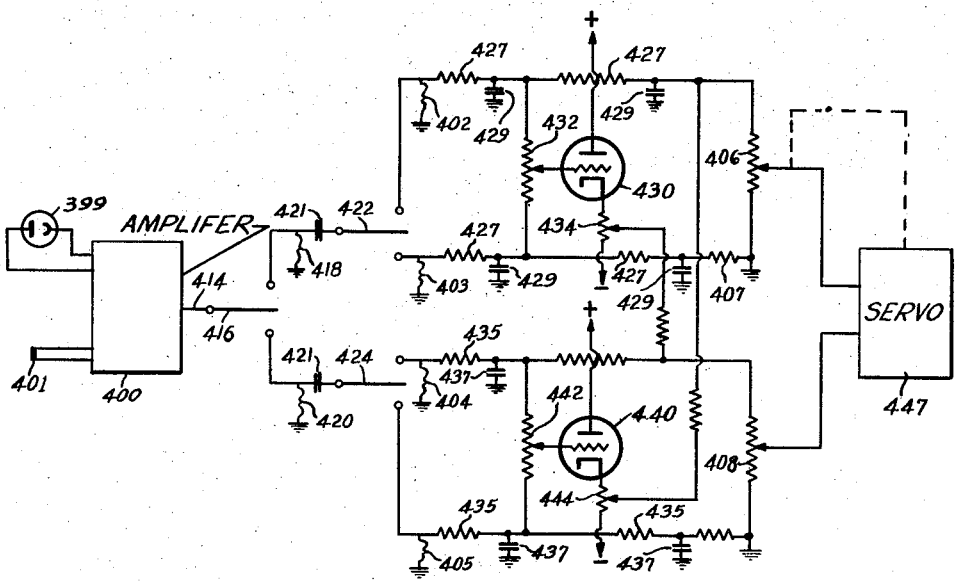
Fig. 4 is a schematic diagram of another embodiment of the invention employing a particular form of vacuum tube amplifier feeding from each channel a fraction of the voltage therein to the other.

are positive.

Fig. 6 is a schematic diagram of a preferred embodiment of the invention applied to compensation of symmetrically mixed signals of the form $$S_G = aA + bB$$
$$S_H = bA + aB$$

the mixing constant $$\frac{b}{a}$$

being assumed to be negative and of less than unity magnitude. The embodiment of Fig. 6 is shown in conjunction with a spectrophotometer in which two series of pulses of the same shape and period are generated with the pulses of one series halfway between those of the other, in which sorting in time is effected at intervals of half the period of the periodic signals, and in which rectification takes place in one channel after sorting by switching operations carried out half a cycle later than the corresponding switching operations for rectification carried out in the other channel. Sorting and rectification under these conditions restricts the mixing of the two signals to a symmetrical type.

Fig. 7 is a series of waveforms explaining the origin of the mixed signals for which the circuit of Fig. 6 provides compensation; and Fig. 8 is an embodiment of our invention as applied to symmetricaly mixed signals, the compensation being introduced after sorting but prior to rectification.

In Fig. 1 there is shown a thermocouple 101 and a photocell 103, suitably energized by means not shown with pulses of radiation having the same repetition rate $$\frac{1}{\tau}$$

(Fig. 2). The photocell and thermocouple will produce either directly or in the associated amplifier 105 voltage pulses of repetition rate $$\frac{1}{\tau}$$

but of different shapes.

The outputs of the thermocouple and photocell are applied to a common linear amplifier 105, which will typically be an A.C. amplifier but which may be a D.C. amplifier instead. The voltage pulses from the photocell as amplified by the amplifier will be assumed to have the shape of waveform A in Fig. 2 while those of the thermocouple will have the shape of waveform B. Waveform C indicates the result of superposition of the two signals in the linear amplifier 105.

The signal generating and sorting apparatus of Fig. 1 is of the type which passes only the A.C. components of the mixed signal present in the amplifier and other common elements of the system to the output channels in which ratio measurement is to be carried out. Rectification of the sorted signals is therefore provided in addition to sorting. In order to permit full wave rectification for maximum sensitivity, the amplifier of Fig. 1 is shown as having two output lines 106 and 108 on which (with reference to ground) there appear in opposite polarities waveform C (plus a D.C. component not shown).

Lines 106 and 108 terminate in sorting switches $S_1$ and $S_2$ which are driven together by a suitable mechanism not shown at the cyclical rate of $$\frac{1}{\tau}$$

$S_1$ feeds on its upper contact an intermediate signal channel 107 leading to the upper contact 119 of a rectifying switch $S_3$. $S_1$ feeds on its lower contact an intermediate signal channel 111 leading to the upper contact 123 of a second rectifying switch $S_4$. Conversely $S_2$ on its upper contact feeds an intermediate signal channel 109 leading to the lower contact 121 of $S_3$. Lastly $S_2$ feeds on its lower contact an intermediate signal channel 113 leading to the lower contact 125 of $S_4$.

By phasing switches $S_1$ and $S_2$ together to contact their upper contacts from $t_1$ to $t_2$, (Fig. 2) the content of waveform C between those times, including the major fraction of waveform A but with an admixture of waveform B, is directed in both polarities toward $S_3$. This mixed wave in which the photocell contribution preponderates is shown in positive polarity at waveform D, as it appears (apart a D.C. level, apart the filtering action in the output channel fed by $S_3$ and apart the compensating action of the invention) on either plate of capacitor 115, i.e. across the intermediate signal channel 107. The contents of waveform C between times $t_2$ and $t_1$, including the major fraction of waveform B but with an admixture of waveform A, is directed in both polarities toward $S_4$. This mixed wave, in which the contribution of the thermocouple preponderates, is shown in positive polarity at waveform H as it appears (apart a D.C. level, apart the filtering action of output channel 141 and apart the compensating action of the invention) across the intermediate signal channel 111. By phasing the sorting switches at times $t_1$ and $t_2$ in period $\tau$ a maximum separation of the signals is achieved, but it is clear that the separation is not complete.

Waveform D appears, subject to the same qualifications, in reversed polarity across the intermediate signal channel 109, and waveform H appears subject to the same qualifications in reversed polarity across the intermediate signal channel 113.

Switches $S_3$ and $S_4$ are driven at twice the rate of switches $S_1$ and $S_2$ and in fixed phase with reference thereto. The phases of $S_3$ and $S_4$ are not alike however. For maximum output, not however essential to the operation of the invention, $S_3$ is phased to contact its upper terminal 119 from $t_3$ to $t_4$ and from $t_5$ to $t_6$, and to contact its lower terminal 121 from $t_4$ to $t_5$ and from $t_6$ to $t_3$ (Fig. 2). $S_4$ is phased to contact its upper terminal 123 from $t_7$ to $t_8$ and from $t_9$ to $t_{10}$ and to contact its lower terminal 125 from $t_8$ to $t_9$ and from $t_{10}$ to $t_7$.

With these phasings of $S_3$ and $S_4$, the contributions of channels 107, 109, 111 and 113 are respectively shown as waveforms E, F, I and J of Fig. 2. Absent the compensation for mixing effected according to the invention by resistors 151 and 153 presently to be described, and apart the filtering action of the resistor-condenser combinations 127, 129 and 135, 137, the voltages on the blades of $S_3$ and $S_4$ are respectively as shown at waveforms G and K.

If the average values of waveforms G and K are denoted $S_G$ and $S_H$ respectively, $S_G$ and $S_H$ are of the form $$S_G = rA + sB \qquad (1)$$
$$S_H = uA + vB \qquad (2)$$

The constants $r$ and $s$ depend as previously stated not only on the shape of waveform A (Fig. 2) (which is a function both of the photocell 103 and amplifier 105 as well as of the shape of the light pulses applied to the photocell) but also on the selection of the sorting times $t_1$ and $t_2$ and on the rectifying times $t_3$—$t_6$, and similarly in the case of the constants $u$ and $v$ applicable to waveform B (Fig. 2). The invention however is independent of the choice made for these times, and is effective regardless of the values of $r$, $s$, $u$ and $v$ so long as $$\frac{rs}{uv}$$

is not equal to unity.

To average the voltages of waveforms G and K, switches $S_3$ and $S_4$ work into three section RC filters. Thus the blade of $S_3$ is connected in series with three resistors 127, and capacitors 129 are connected from the output end of each of the resistors 127 to ground. The combination of resistors 127 and capacitors 129 forms an output channel indicated at 133 having one side grounded and terminated by a resistor 131. The filtered voltage corresponding to waveform G, as modified by the voltage provided by the invention for the compensation of mixing, appears across resistor 131. The voltage at point 140, at the input to resistor 131, is of course much attenuated with respect to that at $S_3$. A similar output channel generally indicated at 141 is fed by $S_4$ and terminated by a resistor 139 across which appears the filtered voltage corresponding to waveform K, as modified by the voltage supplied by the invention for the compensation of signal mixing.

For measurement of the ratio of voltages $S_G$ and $S_H$, taps 143 and 145 feed portions of the voltages across resistors 131 and 139 to a comparison device generally indicated at 147. The device 147 contains a servomechanism connected by the linkage 149 to the tap 143. The difference in voltage between taps 143 and 145 is amplified in the device 147 to energize the servomechanism thereof until tap 143 is moved to a position which makes the voltages at 143 and 145 equal.

In the absence of resistors 151 and 153 the voltages $S_G$ and $S_H$ across resistors 131 and 139 are mixed so that neither is a function alone of waveform A or B of Fig. 2. Consequently the ratio $$\frac{S_G}{S_H}$$

inferred from the position of tap 143, is neither equal for nor proportional to $$\frac{A}{B}$$

To compensate for this signal mixing, the resistors 151 and 153 are connected between channels 133 and 141, with an isolating resistor 135 between the input to 151 and the output from 153, and with an isolating resistor 127 between the input to 153 and the output from 151. Upon connection of resistors 151 and 153 the voltages $S_G$ previously appearing across resistor 131 and $S_H$ previously appearing across resistor 139 in accordance with Equations 1 and 2 are changed to new values $S_{G''}$ and $S_{H''}$. By proper adjustment in the size of resistors 151 and 153 (shown as variable in the figure) and by proper choice of the terminal points 136, 128 and 126, 138, the ratio $$\frac{S_{G''}}{S_{H''}}$$

can be made proportional to the ratio of the amplitude $$\frac{A}{B}$$

of the periodic signals to be compared.

In order to give to the resistors 151 and 153 the required values, the photocell 103 is shielded from illumination. Resistor 151 is then adjusted in value until the voltage across resistor 131 is reduced to zero as observed for example on a separate voltmeter. The thermocouple 101 is then shielded from illumination instead of the photocell, and resistor 153 is adjusted until the voltage across resistor 139 is zero. It may then be necessary to repeat both adjustments one or more times until with zero volts at the output of one channel when the signal therefor is cut off, zero volts may be observed at the output of the other channel without readjustment of either compensating resistor when the other signal is cut off.

With these adjustments compensation is effected for signal mixing, and the voltages appearing across resistors 131 and 139 bear the same ratio as the amplitudes A and B of the pulses of light applied to the photocell and thermocouple, except for a shape factor given by the ratio of the areas under voltage pulses at the output of the amplifier representative of excitation of the photocell and thermocouple when such voltage pulses are of the same amplitude.

Resistor 151 is connected from a point 136 of relatively high signal level in channel 141 to a point 128 of relatively low signal level in channel 133. Resistor 153 is similarly connected from a high level point 126 in channel 133 to a low level point 138 in channel 141. Typically sufficient and proper differences in level between the points 136 and 138 and between the points 126 and 128 are provided by the resistors 135 and 127 of a single filter section in each of the channels 141 and 133. By means of the isolating resistors 135 and 127 between points 136, 138 and 126, 128, the compensating resistors are rendered essentially one-way devices, feeding from the channel to which they are connected at a high signal level to the other channel a fraction of the difference in voltage between their end points, but very little in the reverse direction.

To consider the influence of the voltage at point 138 on the opposite channel 133, this is small both because of the low signal level at point 138 compared to that at point 136 where resistor 151 is connected, and because of the unfavorable divider ratio by which the voltage at point 138 is perceived at point 140 via the sum of resistors 153 and two resistors 127.

Resistor 151 feeds into channel 133 a fraction of the difference between the voltages at points 136 and 128, and resistor 153 feeds into channel 141 a fraction of the difference between the voltages at points 126 and 138. $\gamma$ is the fraction of the voltage difference between points 136 and 128 which is present at the measuring point 140 in channel 133, and $\delta$ is the fraction of the voltage difference between points 126 and 138 which is present at the measuring point 142 in channel 141. By suitable selection of magnitudes for the resistors 151 and 153 and by suitable selection of their terminal points in channels 133 and 141, $\gamma$ and $\delta$ may be given the values necessary to make the ratio of the voltages across terminating resistors 131 and 139 proportional to $$\frac{A}{B}$$

regardless of the values $r$, $s$, $u$ and $v$ so long as $$\frac{rs}{uv} \neq 1$$

and subject only to the condition, usually fulfilled, that $s$ and $u$ be negative.

This may be analyzed as follows: In Fig. 1, let $S_G$ and $S_H$ be the voltages which would appear at points 140 and 142 respectively in the absence of resistors 151 and 153, and let $S_{G''}$ and $S_{H''}$ be the voltages actually appearing at those points with resistors 151 and 153 connected. Let further, assuming 151 and 153 to be connected:

$LS_{G''}$ = voltage actually present at point 126.
$MS_{G''}$ = voltage actually present at point 128.
$NS_{H''}$ = voltage actually present at point 136.
$OS_{H''}$ = voltage actually present at point 138.

In practice each of the multipliers L, M, N and O is to a good approximation equal to the ratio of the D.C. resistance to ground from the point for which it is defined to the resistance to ground at the output measuring point 140 or 142 in its channel. Then $$S_{G''} = S_G + \gamma(NS_{H''} - MS_{G''}) \qquad (5)$$

and $$S_{H''} = S_H + \delta(LS_{G''} - OS_{H''}) \qquad (6)$$

This gives $$S_{G''}(1+\gamma M) = S_G + \gamma N S_{H''} \qquad (7)$$

and $$S_{H''}(1+\delta O) = S_H + \delta L S_{G''} \qquad (8)$$

respectively. Substituting 8 into 7:

$$S_{G''}(1+\gamma M) = S_G + \frac{\gamma N}{1+\delta O}(S_H + \delta L S_{G''}) \qquad (9)$$

Substituting 7 into 8:

$$S_{H''}(1+\delta O) = S_H + \frac{\delta L}{1+\gamma M}(S_G + \gamma N S_{H''}) \qquad (10)$$

Collecting terms in 9:

$$S_{G''}\left(1+\gamma M - \frac{\gamma \delta L N}{1+\delta O}\right) \qquad (9a)$$

$$= S_G + \frac{\gamma N}{1+\delta O} S_H$$

$$= rA + sB + \frac{\gamma N}{1+\delta O}(uA+vB)$$

$$= A\left(r + \frac{\gamma N}{1+\delta O}u\right) + B\left(s + \frac{\gamma N}{1+\delta O}v\right)$$

Collecting terms in 10:

$$S_{H''}\left(1+\delta O-\frac{\gamma\delta LN}{1+\gamma M}\right)$$

$$=S_H+\frac{\delta L}{1+\gamma M}S_G \qquad (10a)$$

$$=uA+vB+\frac{\delta L}{1+\gamma M}(rA+sB) \qquad (11)$$

$$=A\left(u+\frac{\delta L}{1+\gamma M}r\right)+B\left(v+\frac{\delta L}{1+\gamma M}s\right) \qquad (12)$$

If $S_{G''}$ is to measure A:

$$s+\frac{\gamma N}{1+\delta O}v=0, \text{ or } \frac{\gamma N}{1+\delta O}=-\frac{s}{v} \qquad (13)$$

If $S_{H''}$ is to measure B:

$$u+\frac{\delta L}{1+\gamma M}r=0 \qquad (14)$$

or $$\frac{\delta L}{1+\gamma M}=-\frac{u}{r} \qquad (15)$$

Equation 13 may be solved for $\gamma$ giving:

$$\gamma=\frac{s(Ou-Lr)}{NLrv-OMus} \qquad (16)$$

and Equation 15 may be solved for $\delta$ giving:

$$\delta=\frac{u(Ms-Nv)}{LNrv-OMus} \qquad (17)$$

Figure 5:
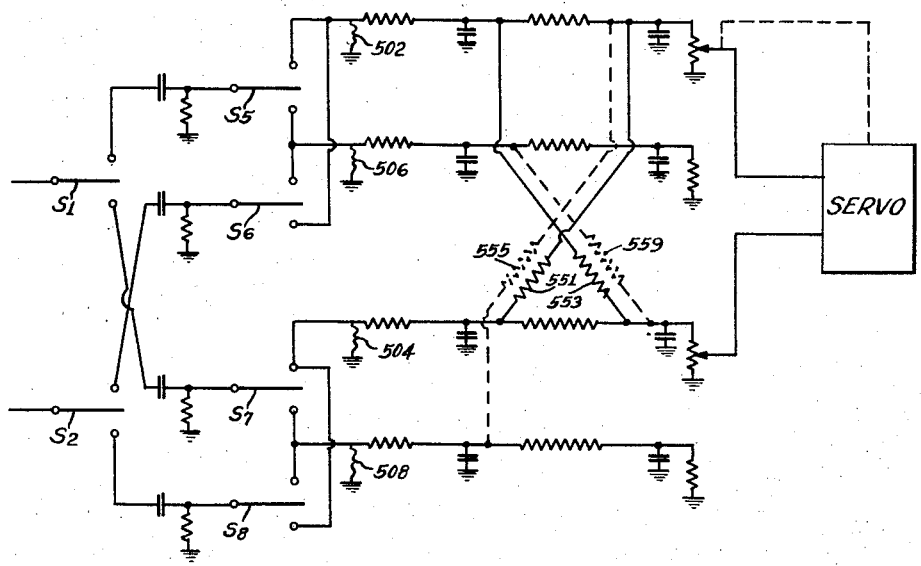
Fig. 5 is an embodiment of the invention similar to that of Fig. 1 but adapted to effect compensation for signal mixing without the use of phase inverters when one or both of the signal mixing constants $$\frac{s}{r} \text{ and } \frac{u}{v}$$

From Equations 16 and 17 it can be seen that by suitably selecting the points 126, 128, 136 and 138 which govern the values of L, M, N and O, $\gamma$ and $\delta$ can always be made of less than unity magnitude, regardless of the values of $r$, $s$, $u$ and $v$, as is necessary since the largest fraction of voltage which can be transferred by a resistance is unity. The embodiment of Fig. 1 can therefore always be employed to effect compensation except in the unusual cases where one or both of the mixing constants $$\frac{s}{r} \text{ and } \frac{u}{v}$$

is positive. Even in such cases resistors can be used for compensation if the negative of the signal required is made available. Fig. 5 illustrates an embodiment of the invention in which this is done.

Of course by choosing for points 128 and 138 the points 140 and 142, O and M will both be of unity value, and it will usually be convenient to do so. When resistors 151 and 153 are properly adjusted, the ratio of the resistance to ground from point 140 via resistor 131 to the resistance to ground from point 136 via resistor 151 is approximately equal to $\gamma$ of Equation 16, and the ratio of the resistance to ground from point 142 via resistor 139 to the resistance to ground from point 126 via resistor 153 is approximately equal to $\delta$ in Equation 17.

The embodiment described in connection with Figs. 1 and 2 effects compensation of asymmetrically (or symmetrically) mixed signals by means of resistors which feed from each output channel into the other a fraction of the difference between the two voltages present in the output channels. Compensation may however be effected by means which feed directly from each channel a fraction of the voltage present therein into the other. Such an embodiment is shown in Fig. 3, which employs vacuum tube amplifiers. These are effective regardless of the sign and magnitude of $r$, $s$, $u$ and $v$ and immediately provide complete isolation, feeding from one channel into the other a fraction of the voltage present in the first regardless of the voltage present in the other. The amplifiers should be D.C. coupled of course.

In Fig. 3 the unsorted output of the amplifier or other common element of the system is applied to a sorting switch 302. The voltage applied to switch 302 may be assumed to be of the general form of waveform C in Fig. 2. In the embodiment of Fig. 3 diodes 304 and 306 are employed to effect half wave rectification of the signal sorted by the switch 302. The rectified voltages produced by diodes 304 and 306 enter the signal channels indicated at 308 and 310, and the ratio-measuring circuit 347 connected to the outputs of these channels may be similar to that described in connection with Fig. 1. The channels include filters made up of resistor condenser combinations 327, 329 and 335, 337 similar to those of Fig. 1. To effect compensation for signal mixing in channel 310, the voltage across channel 308 at a point 326 is applied to a vacuum tube amplifier 312. The output of amplifier 312, a fraction of either sign and of any magnitude of the voltage at 326, is applied to channel 310 at a point 338. A similar amplifier 314 applies a suitably dimensioned fraction of either sign and of any desired magnitude of the voltage present at a point 336 in channel 310 to point 328 in channel 308. While the points 336, 326, 328 and 338 can be chosen at will, it will usually be convenient to make both the pick up points 326 and 336 and the delivery points 338 and 328 identical with the measuring points 340 and 342 at the input to the terminating resistors 331 and 339. By adjustment of the number of stages in amplifiers 312 and 314, the sign and magnitude of the compensating voltages can be given any value necessary to effect full compensation. The adjustment of amplifiers 312 and 314 is made by the same method as that described in connection with the embodiment previously considered. The original signal proper to one of the channels is suppressed, and the amplifier which generates the feedback signal injected into the channel is adjusted until the voltage across the terminating resistance of that channel is zero, and similarly for the other channel.

The operation of the embodiment of Fig. 3 may be explained as follows: If as in the analysis of Fig. 1 $S_G$ and $S_H$ are the voltages across the terminating resistors (here 331 and 339) in the absence of the feedback amplifiers 312 and 314, if $S_{G'}$ and $S_{H'}$ are the voltages across those resistors with the amplifiers connected, and if, the feedback amplifiers being connected, $NS_{H'}$ and $LS_{H'}$ are the voltages actually present at the points 336 and 326 where amplifiers 314 and 312 derive their signals, then:

$$S_{G'}=S_G+\gamma NS_{H'} \qquad (18)$$

$$S_{H'}=S_H+\delta LS_{G'} \qquad (19)$$

Substituting 19 into 18:

$$S_{G'}=S_G+\gamma N(S_H+\delta LS_{G'})$$
$$=S_G+\gamma NS_H+\gamma\delta LNS_{G'} \qquad (20)$$

so that $$S_{G'}(1-\gamma\delta LN)=S_G+\gamma NS_H$$
$$=rA+sB+\gamma N(uA+vB)$$
$$=A(r+\gamma Nu)+B(s+\gamma Nv) \qquad (21)$$

Similarly, substituting 18 into 19:

$$S_{H'}=S_H+\delta L(S_G+\gamma NS_{H'})$$
$$=S_H+\delta LS_G+\gamma\delta LNS_{H'}; \qquad (22)$$

$$S_H(1-\gamma\delta LN)=S_H+\delta LS_G$$
$$=uA+vB+\delta L(rA+sB)$$
$$=B(v+\delta Ls)+A(u+\delta Lr) \qquad (23)$$

Consequently if $S_{G'}$ is to measure A and if $S_{H'}$ is to measure B, it is necessary that:

$$s+\gamma Nv=0 \qquad (24)$$

$$u+\delta Lr=0 \qquad (25)$$

or $$\gamma=-\frac{s}{vN} \qquad (26)$$

$$\delta=-\frac{u}{rL} \qquad (27)$$

It is also necessary that:

$$\frac{rs}{uv} \neq 1$$

In Equations 18 and 26 $\gamma$ is the fraction of the voltage at the pick up point 336 in channel 310 which is made available at the measuring point 340 in channel 308. In Equations 19 and 27 $\delta$ is the fraction of the voltage at the pick up point 326 in channel 308 which is made available at the measuring point 342 in channel 310.

From Equations 26 and 27 it may be seen that $\gamma$ and $\delta$ may assume any values, but the amplifiers may be adjusted to have gains of $\gamma$ and $\delta$ whatever their value.

The completeness with which signal mixing can be eliminated according to the invention depends on the linearity of the common elements employed to derive the mixed signals. The embodiment of the invention of Fig. 3 is shown in conjunction with a rectifying system employing vacuum diodes. While their characteristic is not strictly linear even within the positive range of plate-cathode voltages, it is nearly linear enough to produce acceptable results for many purposes. Even crystal diode rectifiers may be employed. For best results however breaker type rectifying systems such as those of Figs. 1, 4 and 5 are preferred.

Fig. 4 shows another embodiment of the invention employing cathode follower-connected tubes in place of the amplifiers of unspecified type indicated in Fig. 3. In Fig. 4 a half wave rectifying system employing switches is shown. The embodiment of Fig. 4 derives from its switching mechanism both $S_G$, $S_H$ and $-S_G$, $-S_H$ so that it can effect compensation regardless of the sign and magnitude of the mixing constants.

In Fig. 4 there are shown a thermocouple 401 and a photocell 399 feeding amplifier 400. The output of the amplifier will therefore be a signal of the same general shape as waveform C in Fig. 2.

The embodiment shown in Fig. 4 employs half wave rectification. Accordingly the amplifier 400 is shown with a single output line 414 feeding a sorting switch 416 which may be of the same type as one of the switches $S_1$ and $S_2$ of Fig. 1. The sorting switch 416 feeds intermediate signal channels indicated at 418 and 420, each including a capacitor 421 and terminating respectively in rectifying switches 422 and 424. The rectifying switches 422 and 424 operate at twice the speed of the switch 416 and are phased in accordance with the criteria discussed in connection with Fig. 2. Switch 422 alternately feeds output channels 402 and 403, and switch 424 alternately feeds output channels 404 and 405. Thus switch 422 may apply to channel 402 either the positive or negative half of waveform D of Fig. 2, or portions of both halves, and switch 424 applies to channel 404 correspondingly the positive or negative halves of waveform I in Fig. 2, or a combination of both halves. Preferably the D.C. resistance to ground is the same from both contacts of switch 422, and likewise for switch 424. One contact of each switch is used to restore to the condenser 421 in series with the switch blade the charge removed through the other contact. Again preferably, although not necessarily, each of the channels 402 and 403 contains identical filtering elements, and channel 403 is terminated by a resistor 407 identical to resistor 406 which terminates channel 402. Similar identities preferably apply as between channels 404 and 405. Under these conditions the waveform at each point along channel 403 is equal in magnitude but opposite in sign to that at the corresponding point in channel 402, and likewise for channels 404 and 405.

The ratio-measuring circuit including potentiometers 406 and 408 and the comparison device 447 may be of the same type as shown in Fig. 1.

Accordingly the voltages across the terminating resistors 406 and 408 are again of the form $$S_G = rA + sB$$

and $$S_H = uA + vB$$

absent tubes 430 and 440.

Compensation for the signal mixing inherent in the constant $s$ and $u$ is provided by cathode follower tubes 430 and 440, in accordance with Equations 18 and 19.

Potentiometers 432 and 442 are connected between the ungrounded sides of channels 402 and 403, and 404 and 405 respectively at points of equal signal level so that the mid-point of each potentiometer is at ground potential. The grids of tubes 430 and 440 are connected to the taps of these potentiometers, and output voltages without change of sign are taken from the cathode resistors 434 and 444 for application respectively to channels 404 and 402. The cathode resistors may be arranged as potentiometers to provide an additional control over the amount of voltage fed from each channel to the other. Compensation is achieved in practice in a manner similar to that described above with reference to Fig. 3. The illumination of photocell 399 is cut off, and the output of tube 440 is adjusted until the voltage across resistor 406 is zero. The illumination of the thermocouple 401 is then cut off, and the output of tube 430 is adjusted until the voltage across resistor 408 is zero.

By connecting the potentiometers 432 and 442 between points of higher signal level than the points of delivery of tubes 430 and 440, the circuit is enabled to effect compensation regardless of the magnitude of the mixing constants. Unless it is desirable to be able to handle positive mixing constants, the potentiometers 432 and 442 may be connected from channels 402 and 404 to ground, instead of to the inverse channels 403 and 405.

As is evident from Equations 16 and 17, and $\delta$ can always be made less than unity in magnitude so that resistors can always be employed, provided that L and N are given the right sign as well as the right magnitude. Fig. 5 illustrates another embodiment of our invention in which provision is made for all combinations of signs by the development of negative as well as positive values for the mixed signals $S_G$ and $S_H$. As has been previously explained, a positive value for the mixing constant $$\frac{s}{v}$$

means a positive value for the factor $s$ which measures the ingredient of signal B present in the channel proper to signal A. To effect compensation in such case it is therefore necessary to add to that channel a fraction of the negative of signal B, and conversely in the case of a positive value for the mixing constant $$\frac{u}{r}$$

In the circuit of Fig. 5 there are provided four rectifying switches $S_5$, $S_6$, $S_7$ and $S_8$ in place of the switches $S_3$ and $S_4$ of Fig. 1. These switches effect full wave rectification in both polarities of the portions of the mixed signal sorted to them by the switches $S_1$ and $S_2$. Channels 502 and 504 correspond to channels 133 and 141 of Fig. 1 and carry the signals $S_G$ and $S_H$ in positive polarity. The supplementary channels 506 and 508 respectively carry signals in $-S_G$ and $-S_H$. If $$\frac{s}{v} \text{ and } \frac{u}{r}$$

are both negative, compensation is effected as in the case of Fig. 1 by means of resistors 551 and 553. If $$\frac{u}{r}$$

is positive, there is substituted for resistor 551 a resistor 555 (shown in dotted lines), connected between channel 508 and channel 502. If $$\frac{s}{v}$$

is positive, there is substituted for resistor 553 a resistor 559, connected from channel 506 to channel 504. The adjustment of resistors 555 and 559 to the correct values may be accomplished in the same manner as that described in connection with Fig. 1.

Alternatively, a potentiometer may be connected between points of equal signal levels in channels 502 and 506, with a similar potentiometer between points of equal signal level in channels 504 and 508. Compensation may then be effected by means of resistors connected from the taps on these potentiometers to the opposite channels 502 and 504. Or cathode follower amplifiers may be used as in the embodiment of Fig. 4. If cathode followers are so used, the embodiment of Fig. 5 possesses an advantage in sensitivity due to the full wave rectification employed.

The invention has application wherever it may be desired to measure the ratio of the amplitudes of the pulses in two sets of pulses having the same period. Indeed it may be useful in comparing two signals which are initially of a continuous, i.e. direct current, type but in which mixing exists. In a large number of instances however the sets of pulses will be characterized by the same shape so that both can be described as the product of a single function of time multiplied by an amplitude term, each signal having an amplitude term peculiar to itself. As explained above, when the pulses have the same shape as well as the same period, and when they are equally spaced, they may be so sorted that the average value of the A.C. component of the sorted signals after rectification will be of the form $$S_G = aA + bB \quad (3)$$

and $$S_H = bA + aB \quad (4)$$

When the sorted signals are of this form the mixing may be said to be symmetric. Whenever the mixing is symmetric, it may be compensated in both channels by the use of a single feedback resistor (since the mixing contestants $$\frac{b}{a}$$

are the same in both channels). The mixing constant will always be of less than unity value in the sense that it is always possible to associate with one channel the signal preponderating therein before compensation is applied. The compensation of symmetrically mixed signals so derived will be described by reference to Fig. 6 which shows a spectrophotometer in which a single transducer is successively illuminated by pulses of light from a standard and from a sample.

The spectrophotometer shown in Fig. 6 by way of illustration of an application of the invention to symmetrically mixed signals so derived is described in detail in the copending application of Donald F. Hornig, Serial No. 238,746, filed July 26, 1951, now Patent No. 2,761,350. The spectrophotometer includes a source 602, a sector wheel 604, sector mirrors 608 and 616 and concave mirrors 624, 630, 636 and 642. The sector wheel 604 includes two opaque sectors alternated with two equal transparent sectors. Upon rotation of wheel 604 light pulses of the same shape and duration are passed to the mirror 630. The sector mirror wheels 608 and 616 each have two transparent sector and two equal mirrored sectors, those of wheel 608 being on the side presented to mirror 636 and those on wheel 616 being on the side presented to mirror 624. The wheels 608 and 616 are driven at twice the speed of the wheel 604 and are so phased that whereas one pulse developed by the wheel 604 is passed by the wheel 608 to the mirror 624 and reflected at the wheel 616 to the mirror 642 and thence into the spectrometer 650, the next succeeding pulse is reflected at wheel 608 to the mirror 636 and is thence passed through the wheel 616 to the mirror 642 and on to the spectrometer. Reference and sample specimens can be located in the separate optical paths between the wheels 608 and 616 to permit their illumination by successive pulses of light. Accordingly the illumination falling upon the entrance slit of the spectrometer may vary with time in some such fashion as that shown at waveform A of Fig. 7, whose essential characteristic is the presence of two pulses of the same shape and period but of different amplitudes spaced half of the pulse period apart. The spectrometer includes some sort of transducer such as a thermocouple, whose output is passed to an amplifier 655. The amplifier should be as nearly linear as practicable. The amplifier carries outputs of opposite polarity to switches $S_{601}$ and $S_{602}$ similar to Switches $S_1$ and $S_2$ of Fig. 1.

With illumination of the thermocouple as at waveform A, the output of the amplifier 655 may appear approximately as at waveform B. Waveform B will then appear on one switch, say $S_{601}$, and the negative thereof, waveform C, will appear on the other switch $S_{602}$. The sorting and rectifying operations between the switches $S_{601}$ and $S_{602}$ and the output channels 633 and 641 may occur in the same way as has been explained in connection with Fig. 1, subject to the limitation that the sorting intervals $t_2-t_1$ and $t_1-t_2$ (Fig. 7) must each be $$\frac{\tau}{2}$$

($S_{601}$ and $S_{602}$ in phase) and subject to the further limitation that while $t_4-t_3$ need not equal $$\frac{\tau}{4}$$

$t_5-t_3$ and $t_6-t_4$ must each equal $$\frac{\tau}{2}$$

In other words, the rectifying times in one channel must be $$\frac{\tau}{2}$$

later than those in the first, which is to say that they must be at the same times so that $S_{603}$ and $S_{604}$ must operate in phase. Thus if $S_{603}$ contacts its upper contact from $t_3$ to $t_4$, $S_{604}$ must contact its upper contact from $t_5$ to $t_6$. Since $t_5-t_3$ and $t_6-t_4$ are both $$\frac{\tau}{2}$$

$S_{604}$ must also contact its upper contact during the interval $t_4-t_3$. With switches $S_{601}$ and $S_{602}$ operating in phase at times $t_1$ and $t_2$ the voltages across channels 607, 609, 611 and 613 will be respectively of the form of waveforms D, E, F and G. With switches $S_{603}$ and $S_{604}$ operating in phase at the times $t_3$, $t_4$, $t_5$ and $t_6$, the contribution of channels 607 and 609 to channel 633 will be of the form of waveforms H and I respectively while the contribution of channels 611 and 613 to channel 641 will be of the form of waveforms K and L. Accordingly apart the filtering action in channels 633 and 641 and apart the compensation for signal mixing effected according to the invention by resistor 660, the voltages in channels 633 and 641 will be of the form of waveforms J and M. The average value of the waveforms J and M on channels 633 and 641 will be of the form $$S_G = aA + bB$$

and $$S_H = bA + aB$$

Compensation of the mixing in the signals $S_G$ and $S_H$ is effected by means of a single resistor 660 connected between channels 633 and 641, adjusted in accordance with the procedure described in connection with the other embodiments of the invention.

Assuming identity between the two output channels (i.e. from switches $S_{601}$ and $S_{602}$ to the terminating resistors 631 and 639) and linearity of the common elements, i.e. assuming that the conditions for symmetrical mixing are perfectly fulfilled, only one adjustment need be made. If the compensating resistor 660 is adjusted to give zero volts across one terminating resistor when the signal proper to its channel is suppressed at the input to the spectrometer 650, the voltage across the terminating resistor in the other output channel will be zero automatically when the other input signal to the spectrometer is suppressed. The feedback resistor 660 may be connected between the output channels at any signal level, but it must be connected at the same signal level in both.

The application of Equations 16 and 17 to the case of symmetrically mixed signals results in much simplified expressions for the compensating or feedback constants $\gamma$ and $\delta$. Since the feedback resistor must be connected in the two channels at the same signal level, the quantities L, M, N and O must all have the same value, P say. Also from Equations 1, 2, 3 and 4

$$r = v = a$$

and $$s = u = b$$

Therefore:

$$\gamma = \delta = g = \frac{-b}{P(a+b)}$$

When the compensating resistor is properly adjusted, it is related to the mixing constant $g$ by the relation $$g = \frac{\text{terminating resistor}}{\text{compensating resistor} + \text{resistance from either end thereof to ground}}$$

In Fig. 6, $$g = \frac{\text{resistor 631 or 639}}{\text{resistors 660} + 631}$$

When the signal mixing is symmetric, compensation may be effected prior to rectification even though the A.C. components of the sorted signals are to be relied upon in the ratio measurement. An embodiment of the invention effecting compensation in this manner is symmetrically mixed signals is shown in Fig. 8. In Fig. 8 a sorting switch 802 feeds two intermediate signal channels 804 and 806 with portions of a signal derived from two pulse-shaped signals of the same pulse shape and period, equally spaced in time and passed through one or more linear circuit elements. The switch 802 dwells for half the pulse period on one of its contacts and for the other half on its other contact in the same way as switches $S_{601}$ and $S_{602}$ of Fig. 6. Channels 804 and 806 therefore receive voltages of the same general shape as waveforms D and F or E and G, of Fig. 7 respectively. Rectifying switches 808 and 810 operated in phase at twice the speed of switch 802 effect half wave rectification of these signals, feeding channels 833 and 841 with signals of the form of waveforms H and K or I and L of Fig. 7 respectively. Channels 804 and 833 are respectively identical, as nearly as practically may be, to channels 806 and 841 respectively in order to preserve the symmetry of the sorted signals.

Since switches 808 and 810 operate in phase, a fraction of the difference in voltage between channels 804 and 806 transferred from one channel to the other before rectification will be rectified after transfer to the same result as if the same fraction were passed first through rectifying switches 808 and 810 and transferred thereafter. Accordingly the compensating resistor 860 may be connected between channels 804 and 806 as shown instead of between channels 833 and 841.

The invention has been described by reference to Figs. 1–8 as applied to systems in which two sets of periodic pulses to be compared were separated in time so that sorting in time could transmit to separate ratio measuring channels at least unequal amounts of the components of the two pulse signals present in the output of the common elements of the system. In the systems which have been described moreover the A.C. component of the sorted signals has been employed for the ratio measurement. The invention is however independent of the particular method of sorting and switching employed to derive a D.C. voltage for the measurement of ratios. In fact it requires only that the sorted signals to be compensated be of the form of Equations 1 and 2. Signals otherwise related than those of waveforms A and B in Fig. 2 or than those of waveform A in Fig. 7 may be sorted in other ways which will result in either a D.C. or an A.C. component satisfying Equations 1 and 2. If the sorting operation itself effects a substantial degree of rectification, the D.C. component of the sorted signals may be employed for the ratio measurement after a filtering operation in which the A.C. component is simply discarded. For example there is described in an article of A. Savitzky and R. S. Halford ("The Review of Scientific Instruments," volume 21, number 3, March 1950, page 203) a spectrophotometer in which separation of the output of a common amplifier into fractions proper to two series of pulses applied to the amplifier is effected by phase discrimination. The pulse signals to be sorted are of the same shape and period and are 90° displaced in phase. Sorting is achieved by means of a pair of breakers similarly displaced by 90° of the pulse period, and the sorted signals contain a large D.C. component which can be used for measurement of the ratio of the two pulse amplitudes. Unless however the amplifier is free from phase distortion, the phase displacement of the breaker sorting system will no longer match that of the pulses at the output to the amplifier, and signal mixing of the form of Equations 1 and 2 will result. The average value of the D.C. components in the sorted signals may however be compensated in accordance with the principles of the present invention.

We claim:

1. A ratio measuring device comprising a substantially linear circuit element through which may be passed two series of pulse-shaped signals representative of the quantities to be compared, two signal channels composed of linear circuit elements, means to sort the output of said first-named element to said signal channels successively, in cyclical fashion, two resistors connected between said channels with a resistance element in each of said channels between the points of connection thereto of said resistors, and means to compare the voltages in said channels at the ends thereof opposite said sorting means.

2. A ratio measuring device including a substantially linear circuit element through which may be passed signals representative of two quantities to be compared, two distinct channels composed of linear circuit elements, means to sort the output of said first-named element to said signal channels successively in cyclical fashion, a resistor connected between said channels at points of equal D.C. resistance from their terminations remote from the sorting means, and means to compare the voltages in said channel at said last-named terminations.

3. A ratio measuring circuit adapted to measure the ratio of two pulse-shaped signals of the same periodic rate, said circuit comprising a linear circuit element through which said signals may be passed, two signal channels composed of passive linear circuit elements, means to sort the output of said common element to said two channels successively in cyclical fashion at said periodic rate such that a major fraction of the voltage in said output due to the pulses of one of said signals is sorted to one of said channels and a major fraction of the energy in said output due to the pulses of the other of said signals is sorted to the other of said channels, a passive impedance network connected between similarly poled sides of said channels, and means to compare the voltages across the ends of said channels remote from said sorting means.

4. A ratio measuring circuit adapted to measure the ratio of two pulse-shaped signals periodic in the same period, said circuit comprising a linear circuit element through which said signals may be passed, two signal channels composed of passive linear circuit elements, said two channels having no impedance elements in common, said channels having each one side thereof at a fixed potential and having in the other side thereof a plurality of resistors, said channels being terminated by resistors, means to sort the output of said first-named circuit element to the ends of said channels remote from said terminating resistors successively in cyclical fashion at said periodic rate such that a major fraction of the voltage in said output due to the pulses of one of said signals is sorted to one of said channels and a major fraction of the voltage in said output due to the pulses of the other of said signals is sorted to the other of said channels, a resistive network coupling together the sides of said channels opposite the sides thereof at fixed potential, and means to compare the voltages across said terminating resistors.

5. A ratio measuring circuit including a linear circuit element through which may be passed two series of pulse-shaped signals of the same shape, equally spaced and periodic in the same period, two substantially identical signal channels composed of linear circuit elements, means to sort the output of said common element to said channels successively in cyclical fashion at said periodic rate with equal sorting times to said two channels, a resistance element having the same resistance in both directions connected between similar poled sides of said channels at points therein of equal D.C. resistance from the ends of said channels remote from said sorting means, and means to compare the voltages in said channels at said last-named ends.

6. Apparatus for measurement of the ratio of two pulse-shaped signals of the same shape and of amplitudes A and B which are periodic in the same period and are equally spaced in that period, said apparatus comprising a linear transducer to which said signals may be applied, substantially identical signal channels G and H composed of linear circuit elements, said channels having each a terminating resistor across one end thereof, means connecting to the same point of fixed potential at least one point in each of said channel, said points having the same impedances from corresponding ends of said channels, means to sort the output from said transducer to said channels successively for successive halves of said period, a bidirectionally equally conducting resistance element connected between like sides of said channels at points therein of equal resistance from said point of fixed potential, and means to compare the voltages across said terminating resistors.

7. A ratio measuring circuit adapted to measure the ratio of two pulse-shaped voltage signals periodic in the same period, said circuit comprising a linear circuit element through which said signals may be passed, two substantially identical signal channels composed of linear circuit elements and without common impedance elements, said channels having each one side thereof at a fixed potential and having in the other side thereof a plurality of resistors, said channels being terminated by substantially identical resistors, means to sort the output of said first-named circuit element to the ends of said channels remote from said terminating resistors successively in cyclical fashion at said periodic rate with equal sorting times to said two channels such that a major fraction of the voltage in said output due to the pulses of one of said signals is sorted to one of said channels and a major fraction of the voltage in said output due to the pulses of the other of said signals is sorted to the other of said channels, a resistor connected between the sides of said channels opposite the sides thereof at fixed potential, the connections of said resistor into said channels being at points of equal resistance from corresponding ends of said terminating resistors, said resistor being of such magnitude that upon suppression of said one signal the average voltage across the terminating resistor of said one channel is zero and that upon suppression of the other of said signals the average voltage across the terminating resistor of said other channel is zero, and means to compare the voltages across said terminating resistors.

8. Apparatus for measurement of the ratio of two pulse-shaped signals of the same shape, of amplitudes A and B, periodic at the same rate, and spaced apart 180 electrical degrees in that period, said apparatus comprising a linear transducer to which said signals may be applied, two terminating resistors of the same value having each one end connected to a common point of fixed potential, two identical filter circuits connected each across one of said terminating resistors, means to couple the output of said transducer to the inputs of said filter circuits successively in cyclical fashion at said periodic rate for equal halves of said period, a compensating resistor connected between said filter circuits at points therein of equal resistance from said one ends of said terminating resistors, and means to compare the voltages across said terminating resistors.

9. Apparatus for measurement of the ratio of two pulse-shaped signals of the same shape, of amplitudes A and B, periodic at the same rate, and spaced apart 180 electrical degrees in that period, said apparatus comprising a linear transducer to which said signals may be applied, two terminating resistors of the same value having each one end connected to a common point of fixed potential, two identical filter circuits G and H connected each across one of said terminating resistors, means to couple the output of said transducer to the inputs of said filter circuits successively in cyclical fashion at said periodic rate for equal halves of said period to produce in said filter circuits G and H voltages $S_G$ and $S_H$ whose average values without compensating means are $aA$ plus $bB$ and $bA$ plus $aB$ respectively wherein $b/a$ is less than unity and wherein $a$ is the fraction of the voltage A in circuit G and the fraction of voltage B in circuit H and $b$ is the fraction of voltage B in circuit G and the fraction of voltage A in circuit H, means to compensate for the presence of voltage due to the signal of amplitude A in circuit H and of voltage due to the signal of amplitude B in circuit G, said last-named means comprising a resistor connected between said filter circuits at points therein of equal resistance from said terminating resistors, said last-named resistor having such value that upon suppression of and signal of amplitude A the average value of the voltage across circuit G is zero and upon suppression of and signal of amplitude B the average value of voltage across circuit H is zero, and means to compare the voltages across said terminating resistors.

10. Apparatus for measurement of the ratio of two pulse-shaped signals of the same shape, of amplitudes A and B, periodic at the same rate, and spaced apart 180 electrical degrees in that period, said apparatus comprising a linear transducer to which said signals may be applied, two terminating resistors of the same value having each one end connected to a common point of fixed potential, two identical filter circuits G and H connected each across one of said terminating resistors, means to couple the output of said transducer to the inputs of said filter circuits successively in cyclical fashion at said periodic rate for equal halves of said period to produce in said filter circuits G and H voltages $S_G$ and $S_H$ whose average values without compensating means are $aA$ plus $bB$ and $bA$ plus $aB$ respectively wherein $b/a$ is less than unity and wherein $a$ is the fraction of the voltage A in circuit G and the fraction of voltage B in circuit H and $b$ is the fraction of voltage B in circuit G and the fraction of voltage A in circuit H, means to compensate for the presence of voltage due to the signal of amplitude A in circuit H and of voltage due to the signal of amplitude B in circuit G, said last-named means comprising a resistor connected between said filter circuits at points therein of equal resistance from said terminating resistors, said last-named resistor having such value that the resistance from either of its ends via itself to said one end of the terminating resistor across which the opposite of said filter circuits is connected is substantially proportional to the product of said terminating resistor and the factor $(a+b)/-b$, the factor of proportionality being substantially the ratio of the resistance from one end of said compensating resistor to the said one end of the terminating resistor adjacent such end of the compensating resistor to the resistance of such terminating resistor, and means to compare the voltages across said terminating resistors.

11. Apparatus for measurement of the ratio of two pulse-shaped signals of amplitudes A and B periodic at the same rate, said apparatus comprising a linear transducer to which said signals may be applied in cyclically successive fashion, separate signal channels G and H composed of passive linear circuit elements, said channels having each a terminating resistor across the output end thereof, means connecting to a point of fixed potential two corresponding points, one in each of said channels, means to sort to said channels at the ends thereof remote from said output ends temporally successive portions of the output of said transducer in cyclical fashion at said periodic rate, whereby the signals $S_G$ and $S_H$ sorted to said channels are of the form $rA$ plus $sB$ and $uA$ plus $vB$ wherein $r$ is the fraction of voltage A in channel G, $s$ is the fraction of voltage B in the channel G, $u$ is the fraction of voltage A in channel H and $v$ is the fraction of voltage B in channel H, a first resistor connected from a point of high signal level in channel G to a point of low signal level in channel H, a second resistor connected from a point of high signal level in channel H to a point of low signal level in channel G, said last-named resistors having such value that upon separate reduction of amplitudes A and B to zero at the input to said common element, the signals at the output of channels G and H are separately reduced to zero, and means to compare the voltages across said terminating resistors.

12. Apparatus for measurement of the ratio of two pulse-shaped signals of amplitudes A and B periodic at the same rate, said apparatus comprising a linear transducer to which said signals may be applied, an A.C. amplifier coupled to said transducer, two terminating resistors having each one end connected through the same resistance to a common point of fixed potential, two passive filter circuits connected each across one of said resistors, means including separate rectifiers, one for each of said filter circuits, to connect the output of said amplifier to the inputs of said filter circuits successively in cyclical fashion at said periodic rate, two compensating resistors cross connected between said filter circuits, one of said compensating resistors being connected from a point in one filter circuit remote from the terminating resistor in said one circuit to a point adjacent the terminating resistor in said other circuit and the other of said compensating resistors being connected from a point in said other circuit remote from said terminating resistor in said other circuit to a point adjacent the terminating resistor in said one circuit, and means to compare the voltages across said terminating resistors.

References Cited in the file of this patent

UNITED STATES PATENTS

| 2,216,545 | Cannon | Oct. 1, 1940 |
|---|---|---|
| 2,365,218 | Rogers | Dec. 19, 1944 |
| 2,488,193 | Hughes | Nov. 15, 1949 |
| 2,547,703 | Hermont | Apr. 3, 1951 |
| 2,553,294 | Blewett | May 15, 1951 |
| 2,578,133 | Hawkins | Dec. 11, 1951 |
| 2,580,421 | Guanella | Jan. 1, 1952 |
| 2,599,064 | Minton | June 3, 1952 |
| 2,609,988 | Beckwith | Sept. 9, 1952 |

UNITED STATES PATENT OFFICE

CERTIFICATE OF CORRECTION

Patent No. 2,896,165                                                    July 21, 1959

Donald F. Hornig et al

It is hereby certified that error appears in the printed specification of the above numbered patent requiring correction and that the said Letters Patent should read as corrected below.

Column 3, line 45, for "usual" read -- unusual --; column 4, line 22, for "form" read -- forms --; column 7, line 17, strike out "for"; column 12, line 38, before "and", second occurrence, insert the symbol -- $\gamma$ --; column 13, lines 45 and 46, for "contestants" read -- constants --; column 17, line 36, for "similar" read -- similarly --.

Signed and sealed this 22nd day of December 1959.

(SEAL)
Attest:

KARL H. AXLINE                                                       ROBERT C. WATSON
Attesting Officer                                                 Commissioner of Patents